US008117752B2

(12) United States Patent
Breitenbach et al.

(10) Patent No.: US 8,117,752 B2
(45) Date of Patent: Feb. 21, 2012

(54) METHOD FOR PRODUCING A ROTARY JOINT

(75) Inventors: Rainer Breitenbach, Gochsheim (DE); Florian Koeniger, Schweinfurt (DE); Peter Niebling, Bad Kissingen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/784,895

(22) Filed: May 21, 2010

(65) Prior Publication Data

US 2010/0287758 A1   Nov. 18, 2010

Related U.S. Application Data

(62) Division of application No. 10/596,054, filed on May 26, 2006, now abandoned.

(30) Foreign Application Priority Data

Nov. 28, 2003  (DE) .................................. 103 55 684
Nov. 24, 2004  (WO) ................ PCT/DE2004/002607

(51) Int. Cl.
*B21D 39/00*    (2006.01)
*B21D 53/10*    (2006.01)
*F16C 3/00*     (2006.01)

(52) U.S. Cl. ........... 29/898.07; 29/434; 29/446; 29/469; 29/525.01; 29/525.02; 464/182; 384/544

(58) Field of Classification Search .................... 29/434, 29/446, 469, 525.02, 525.11, 898.07; 384/544; 403/1, 321, 322.1, 259, DIG. 6; 464/178, 464/182; 301/35.626, 105.1, 114
See application file for complete search history.

(56) References Cited

U.S. PATENT DOCUMENTS

| 382,902 | A |   | 5/1888  | Richardson |
| 528,293 | A |   | 10/1894 | Fawcett |
| 3,635,303 | A |   | 1/1972 | Hetmann et al. |
| 3,969,804 | A | * | 7/1976 | MacInnes et al. ....... 29/888.025 |
| 4,433,877 | A |   | 2/1984 | Colanzi |
| 5,308,183 | A |   | 5/1994 | Stegemann et al. |
| 5,651,588 | A |   | 7/1997 | Kato |
| 5,725,285 | A |   | 3/1998 | Niebling et al. |
| 5,757,084 | A | * | 5/1998 | Wagner ..................... 301/105.1 |
| 6,247,219 | B1 | * | 6/2001 | Austin et al. .................... 29/434 |
| 6,783,342 | B2 |   | 8/2004 | Norman et al. |
| 7,192,213 | B2 |   | 3/2007 | Mermoz |
| 2007/0160317 | A1 | * | 7/2007 | Niebling et al. ............. 384/544 |

FOREIGN PATENT DOCUMENTS

| DE | 18 06 566 A | 5/1970 |
| DE | 195 43 436 | 5/2008 |
| GB | 2 171 040 A | 8/1986 |
| GB | 2 301 548 A | 12/1996 |
| JP | 54146303 | 11/1979 |
| JP | 55051601 | 4/1980 |
| JP | 4349001 | 12/1992 |

* cited by examiner

*Primary Examiner* — Jermie Cozart
(74) *Attorney, Agent, or Firm* — Lucas & Mercanti, LLP; Klaus P. Stoffel (57) ABSTRACT

A method and an assembly device for producing a rotary joint between a drive element and a flange are defined. The drive element and the flange are screwed together by a nut and a bolt of the drive element. The bolt is drawn axially in to a bore in the flange by the rotation of the nut and until the drive element attains a final position in relation to the flange.

8 Claims, 14 Drawing Sheets

METHOD FOR PRODUCING A ROTARY JOINT

This application is a Divisional application of U.S. application Ser. No. 10/596,054 filed May 26, 2006, now abandoned which in turn is a 371 of PCT/DE04/02607 filed Nov. 24, 2004, which in turn claims priority of DE 1003 55 684.2 filed Nov. 28, 2003. The priority of these applications is hereby claimed and these applications are incorporated by reference herein.

FIELD OF THE INVENTION

The invention relates to a method, an assembly device and a nut for producing a rotary joint between a drive element and a flange, in which the drive element and the flange are screwed to one another at least by the nut and by a bolt of the drive element at least until the bolt is by rotation of the nut drawn axially into a hole of the flange as far as an end position of the drive element in relation to the flange.

BACKGROUND OF THE INVENTION

A screwed joint for driven wheels of motor vehicles is described in DE 195 43 436 C2. The screwed joint connects a wheel flange to a drive element, for example to an articulation bell of a drive shaft, of the vehicle. With this joint, a rotationally fixed joint which consequently transmits torques from the drive element to the wheel flange is produced. The wheel flange is fixed to the vehicle and receives a bearing arrangement for a vehicle wheel.

A through-hole extends axially through the flange. A bolt-like extension of the drive element is introduced into the through-hole and is by means of the screwed joint connected to the wheel flange in a rotationally fixed manner and secured thereon. The rotary joint is alternatively produced by press connections, positive connections or preferably a combination of press and positive connections. The connections allow torques to be transmitted from the drive element to the flange and vice versa in the peripheral direction about the longitudinal central axis of the wheel flange. The joint is to be absolutely play-free.

The screwed joint is highly loaded. On the one hand, depending on bearing design, preloading forces for a play-free bearing are to be generated with the screwed joint and, on the other hand, the rotary joint and the axial retention of the drive element on the flange are to be secured.

During mounting of the drive element in the flange, the bolt of the drive element is to begin with introduced into the bore of the flange until a thread on the free end of the bolt protrudes on the other side of the hole. A nut is then screwed onto this thread to form a loose screwed joint with the bolt until the nut is supported axially on the flange.

The nut is then tightened. In the course of this, resistances on the bolt to the drive element being drawn into a press connection have to be overcome by rotation of the nut. These resistances arise by virtue of overlaps between the bolt-like extension of the drive element and the hole in the flange. Examples of such positive press connections are pairings of longitudinal toothings on the inside of the hole of the flange with longitudinal toothings on the outside of the bolt, which are additionally secured or rendered play-free by press fits in the tooth pairings. When the drive element is drawn into the flange, the nut is therefore axially supported on a supporting surface of the flange.

The axial resistances originating from the press connection are overcome by high tightening torques on the nut. High frictional moments arise between the nut and the supporting surface owing to the great tightening torques. The level of the tightening torques to be applied to the nut with an assembly device is therefore determined on the one hand by the level of the axial resistances to drawing-in and on the other hand by the frictional conditions between nut and guide surface plus the friction in the thread pairing.

The level of these tightening torques is difficult to assess as these forces are determined by various influencing factors such as manufacturing tolerances in the pairings and press connections and also by frictional losses of varying size. The tightening torque which is necessary in order to overcome these resistances can vary in the range of a desired tightening torque which is necessary in order effectively to secure the unit axially. It is therefore often not possible to distinguish whether the tightening torque on the nut measured directly or indirectly during screwing together has been brought about by the axial resistances which are difficult to calculate or by sufficient axial prestressing of the joint and of the bearing.

As the screwing tools as a rule switch off when the desired value of this tightening torque is reached, this frequently results in practice in the bearing or the rotary joint being inadequately prestressed. This leads to loosening of the screwed joint, to unacceptable play in the wheel bearing arrangement and/or to micromovements between the drive element and the flange. These micromovements give rise to noise and wear. The wear may cause indentations in the drive element which can lead to breakage of the drive element.

SUMMARY OF THE INVENTION

It is therefore the object of the invention to provide a method, an assembly device and a nut which is suitable for the assembly device and the method with which the disadvantages indicated above are avoided.

This object is achieved with the subject matter of claim 1, further independent claims and the dependent claims.

The method serves for producing a rotary joint between a drive element and a flange. The drive element, preferably the bell of a cardan shaft of a wheel drive, is introduced and pressed into the through-hole of the flange by means of a bolt which is separate from the drive element or a bolt-like extension designed in one piece with the drive element. The through-hole, as a rule provided with a longitudinal toothing, extends rotationally symmetrically in relation to the longitudinal central axis and consequently the axis of rotation of the flange.

Longitudinal toothing and tooth pairings mean all elements, that is splinings, helical toothings and other key/groove connections as well, which are suitable for transmitting torques between the drive element and the flange or vice versa about the axis of rotation of the flange. The invention can also be applied for producing all other conceivable positive or positive/non-positive connections such as cone connections or press pairings in cylindrical bores.

Bolts mean all rotationally symmetrical or approximately rotationally symmetrically designed connection elements which are suitable for producing a shaft/hub joint between the drive element and the hub. These are, for example, the separate screw bolts and bolt-like extensions on the drive element designed in one piece with the drive element which have already been mentioned above.

The bolts preferably have an external toothing which corresponds functionally or positively to an internal toothing in the hole of the flange and are at their free end provided with a thread. In this connection, the thread is either an internal thread or preferably an external thread.

The nut, in all designs conceivable for the application, has a counterthread corresponding to the thread on the bolt and is moreover according to the invention undercut axially on a portion from the direction of the flange. The undercut(s) is (are) designed in such a way that the nut can be gripped behind axially and kept spaced axially in relation to the flange during screwing together of the bolt/nut screwed joint. For this, the nut has at least one radial recess, preferably on the outside, in which corresponding clamping elements of an assembly tool can engage. Such radial recesses are preferably radial grooves formed on the inner periphery or on the outer periphery of the nut. It is also conceivable for the outer lateral surface of such a nut to be of conical design or made as the surface of a truncated pyramid for a releasable clamping connection.

The method steps are:
- introduction of the bolt into the through-hole of the flange from one of the sides of the flange. In this connection, the bolt or the bolt-like extension on the drive element is guided axially into the hole until a loose screwed joint can be produced at the other end of the hole between the thread on the bolt and the counterthread of the nut. For this, either at least part of the thread of the bolt protrudes freely from the hole or the nut enters into the hole with the counterthread for threading onto the thread of the bolt.
- mounting and rotating the nut onto the bolt until it bears a sufficient number of turns of the screwed joint;
- screwing the nut together with the bolt by rotating the nut. In this connection, the nut is kept spaced axially in relation to the flange by means of a device at least until the drive element is located in the end position by virtue of rotation of the nut.
- releasing the nut from the axial retention;
- screwing the nut together with the bolt until it bears against the flange;
- securing the nut by rotating the nut against the flange with defined tightening torques.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
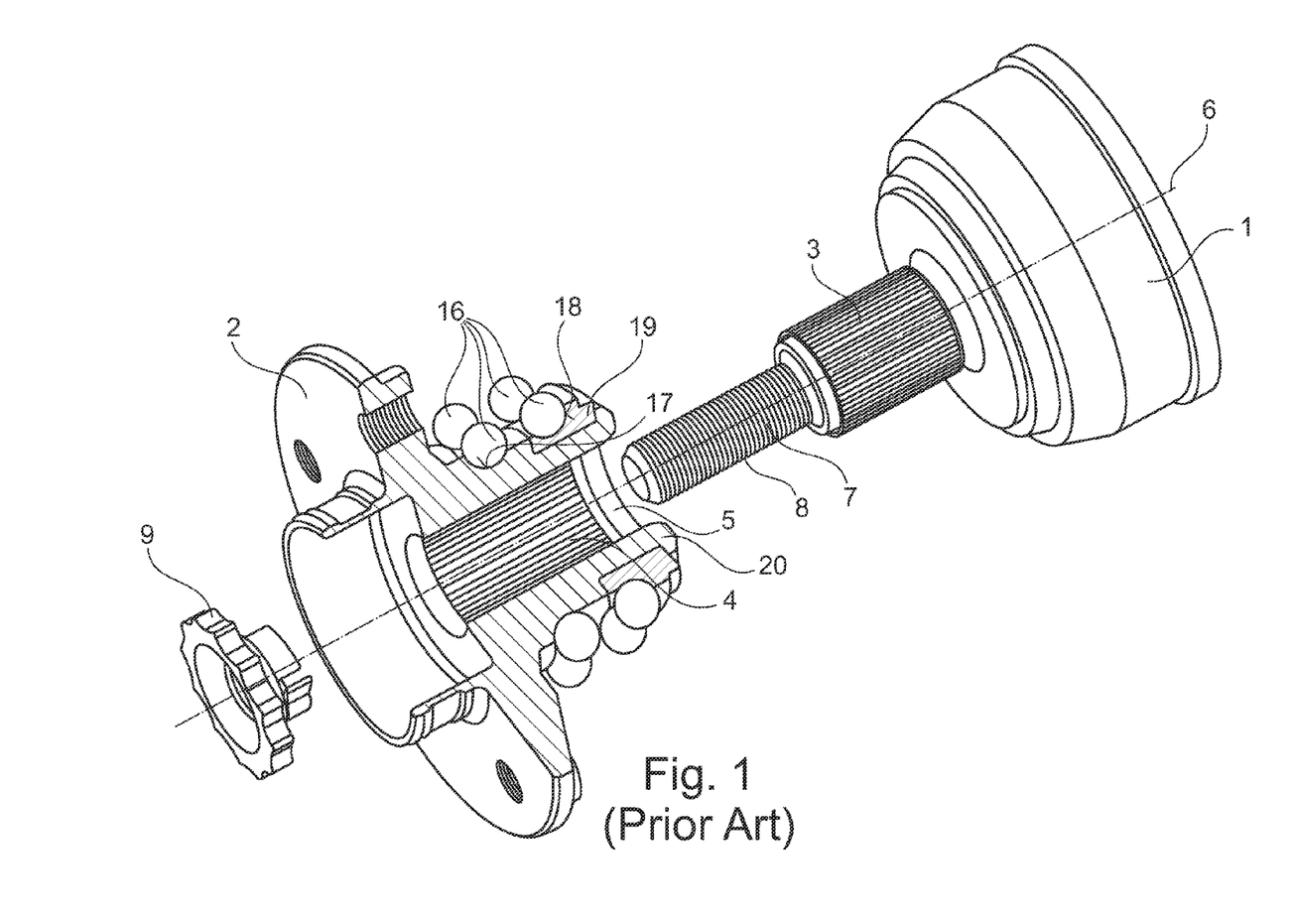
FIG. 1 is a perspective view of a drive element and flange assembly constructed in accordance with the prior art.
Figure 2:
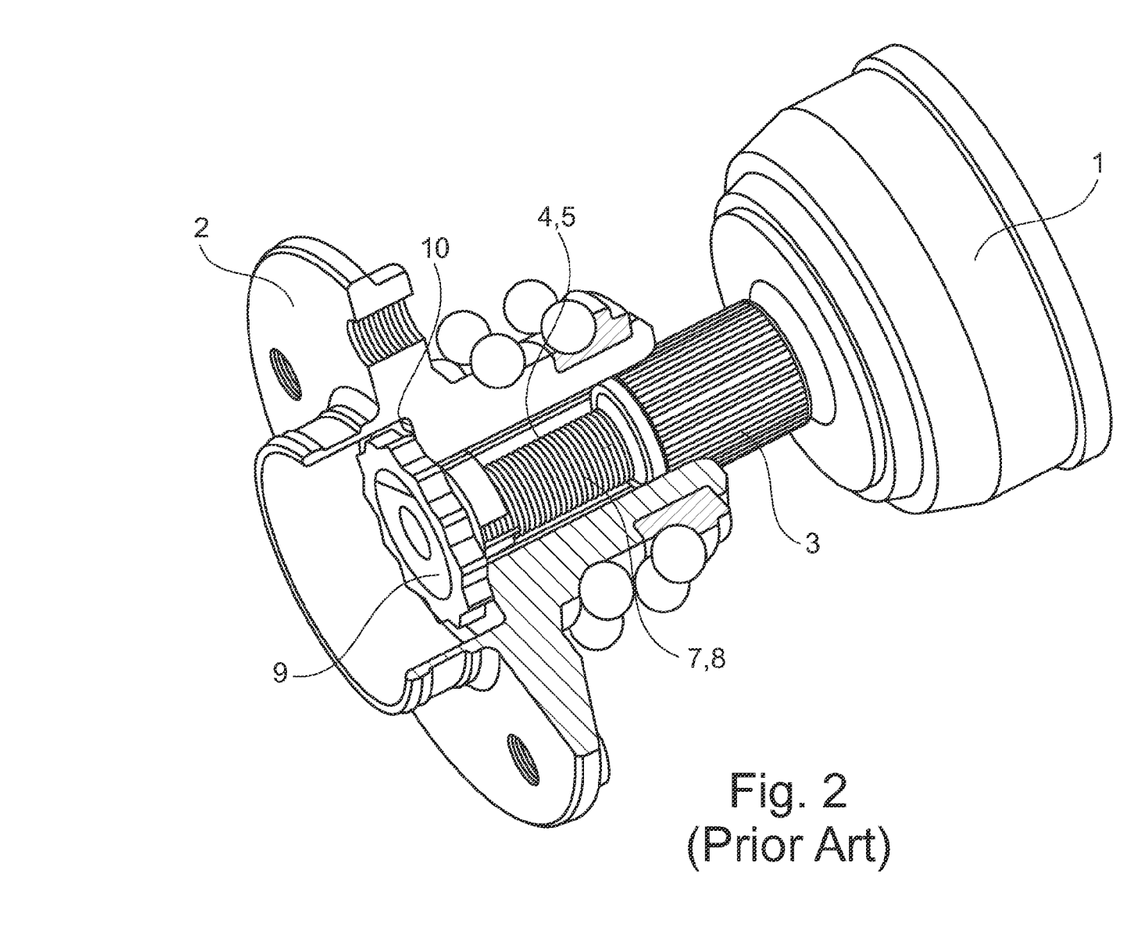
FIG. 2 provides a partially assembled view of the drive element and flange assembly of FIG. 1.
Figure 3:
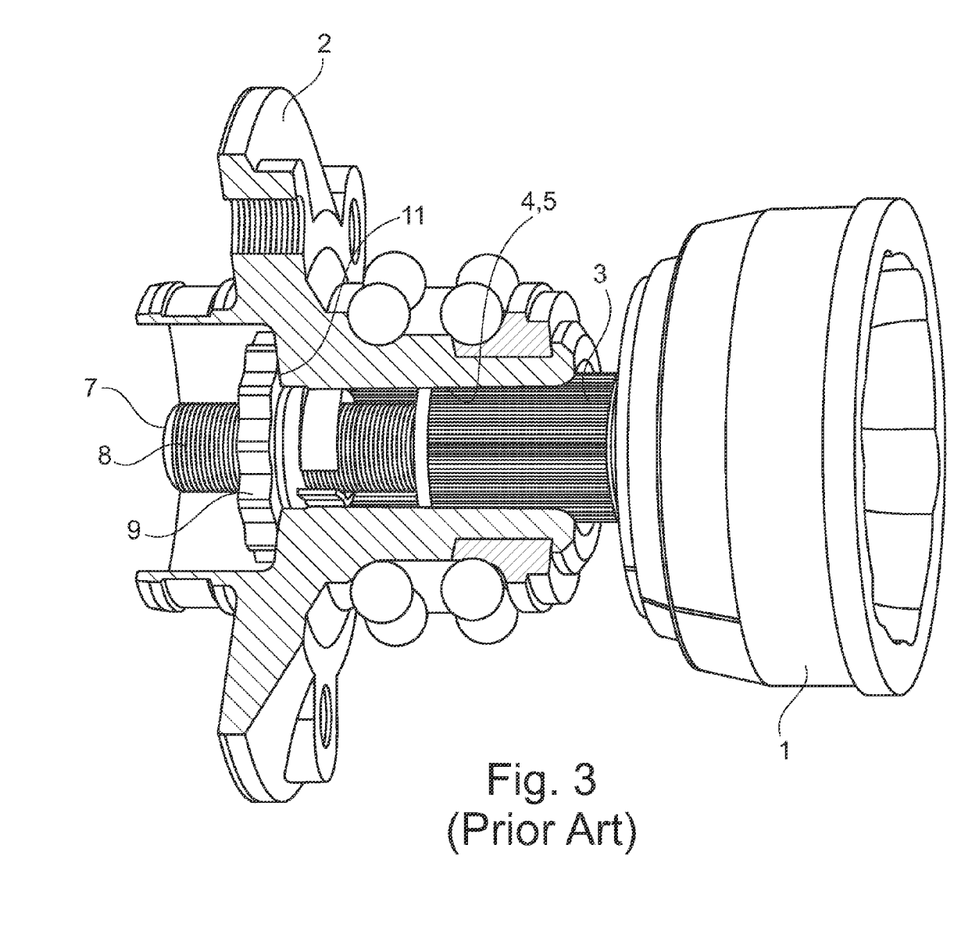
FIG. 3 provides a partially assembled view of the drive element and flange assembly of FIG. 1 illustrating the engagement between the flange and the nut.

FIGS. 1 to 3 serve for detailed description of the background of the invention.

FIG. 1 shows a drive element 1 which is to be connected to a flange 2 for receiving a vehicle wheel (not illustrated). The rotary joint between the flange 2 and the drive element 1 is produced by means of meshing teeth of the external toothing 3 on a bolt-like extension of the drive element and of an internal toothing 4 in an axial hole 5 of the flange. However, this rotary joint is not produced purely by positive connection of the meshing toothings 3 and 4 but at the same time by a press connection of the toothings 3 and 4, in which the meshing teeth are at least partly plastically deformed on one another.

The flange 2 is mounted rotatably on a vehicle about the longitudinal central axis 6 by means of a wheel bearing arrangement. As a rule, wheel bearing arrangements have two rows of rolling elements, which in this illustrative embodiment are balls 16. A raceway 17 for one row of balls 16 is formed in the flange 2. The raceway 18 of the other row of balls 16 is designed on an inner ring 19 which is held axially on the flange 2 by means of a flanged rim 20.

By screwing the nut 9 together with the bolt 7, the wheel bearing arrangement is as a rule at the same time prestressed play-free axially via the flanged rim 20. In addition, the rotary joint is secured axially against loosening by means of the nut 9.

The drive element 1, the articulation bell of a drive shaft (not illustrated) is to begin with introduced into the hole 5 axially along the longitudinal central axis 6 from one side of the flange 2 until the external toothing 3 and the internal toothing 4 meet. A bolt 7 designed in one piece with the drive element 1 then protrudes from the hole 5 on the other side of the flange 2. The bolt 7 has an external thread 8 which corresponds to an internal thread of a nut 9.

In the next step of the method, the nut 9 is screwed onto the external thread 8 of the bolt 7. The rotation of the nut 9 onto the external thread 8 can to begin with be carried out virtually without resistance. When, as illustrated in FIG. 2, the nut 9 bears axially against the supporting surface 10 of the flange 2, however, the tightening torque on the nut 9 increases counter to the resistance of the press fits between internal toothing 4 and external toothing 3. It is possible to draw the external toothing 3 axially into the hole 5 only with high tightening torques on the nut 9. In the process, the nut 9 is supported axially on the supporting surface 10. The tightening torque on the nut 9 is increased by the friction on the contact area 11 between nut 9 and supporting surface 10 (FIG. 3).

Figure 4:
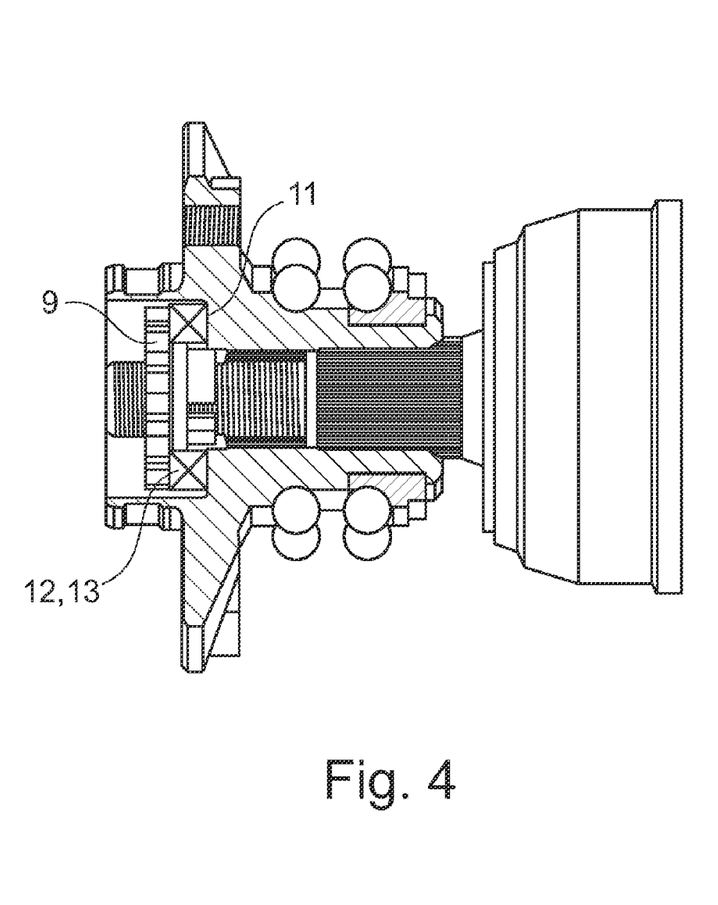
FIG. 4 is a perspective view of one embodiment of the present invention.
Figure 4A:
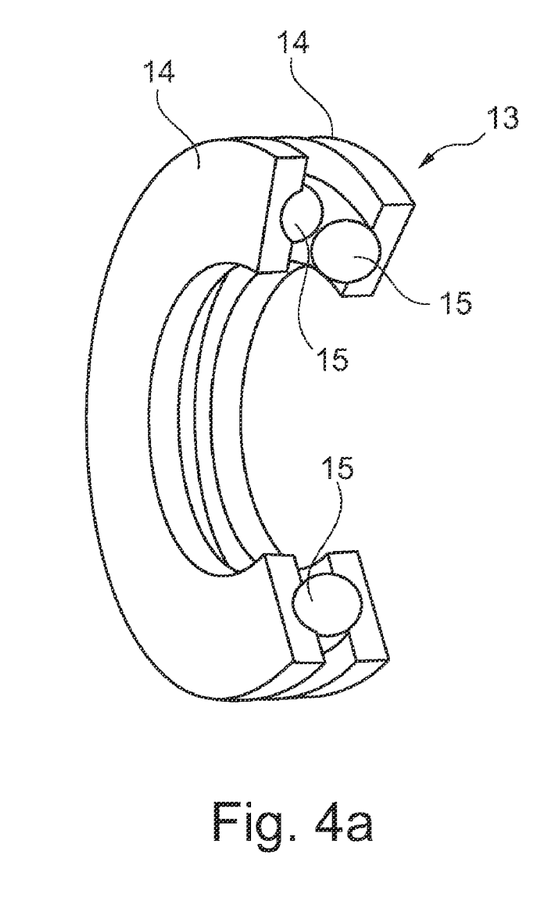
FIG. 4a is a perspective view of bearing of FIG. 4.

FIGS. 4 and 4a show a first solution proposal by which the friction on the contact area 11 between nut 9 and supporting surface 10 can be reduced by means of an axial bearing 12. The bearing 12 is alternatively a sliding bearing or, as illustrated in FIG. 4a, preferably an axial rolling bearing 13 consisting of two axial disks 14 and balls 15. After production of the rotary joint between the flange 2 and the drive element 1, the bearing 12 is either removed by loosening the nut 9 or alternatively remains permanently in the unit. When the bearing has been removed, the or another suitable nut is screwed onto the bolt 7 again, and the system is finally prestressed axially with appropriate tightening torques.

The method, the device and a nut for producing a rotary joint between a drive element 21 and the flange 2 are described in greater detail below with reference to FIGS. 5 to 13.

Figure 13:
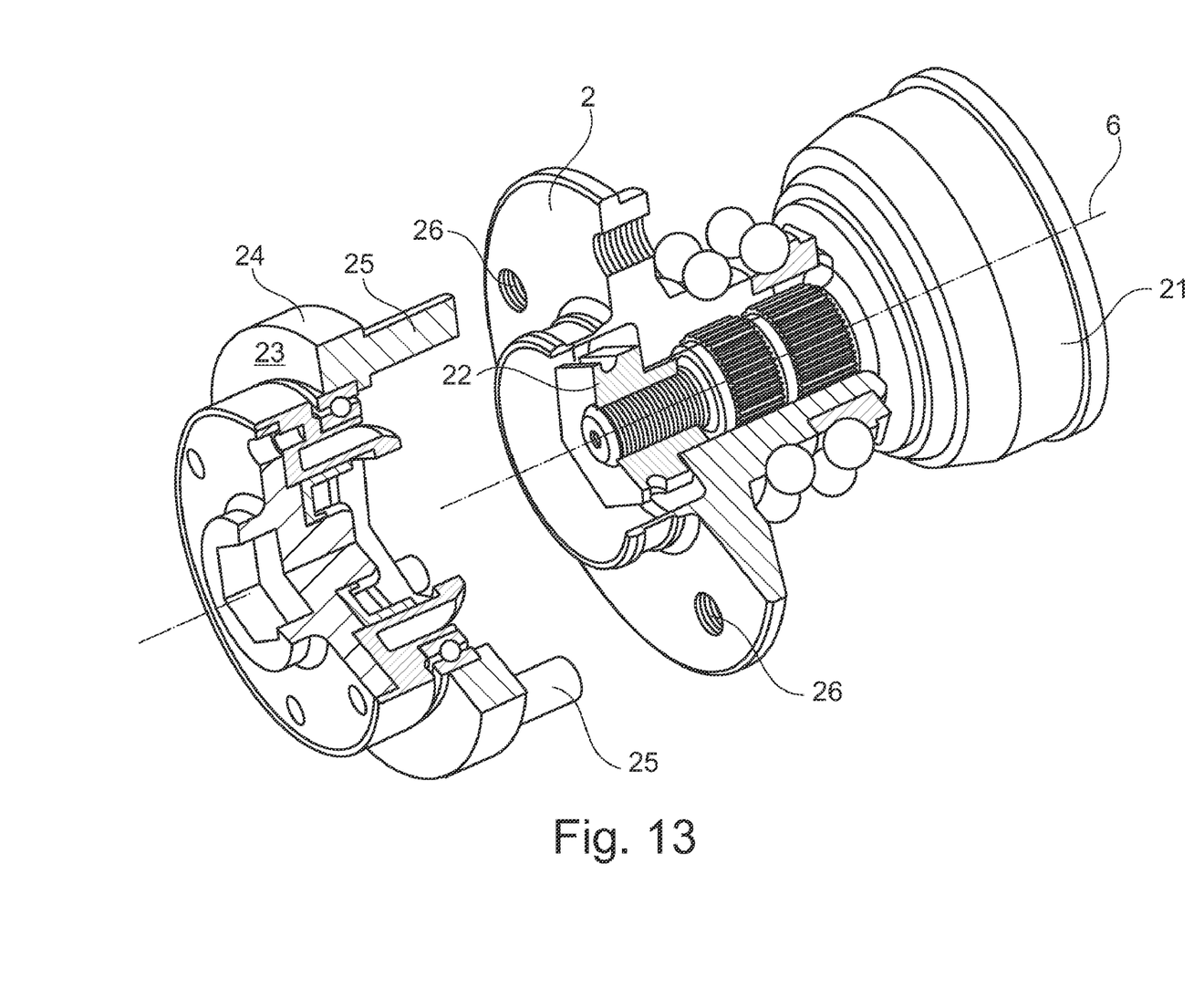
FIG. 13 provides a fully assembled view of the drive element and flange assembly of FIG. 9.

FIG. 13 shows the finished rotary joint between the flange 2 and a drive element 21. The drive element 21 is an articulation bell of a cardan drive of a vehicle. The rotary joint between the drive element 21 and the flange 2 is axially prestressed and secured by means of a nut 22. A device 23 has been used to produce the finished joint illustrated in FIG. 11

The device 23 has a supporting ring 24 from which guide pins 25 project axially in the direction of the flange 2. The guide pins 25 are aligned parallel to the longitudinal central axis 6 and fit in the through-holes 26 in the flange 2. As can be seen from FIG. 5, a clamping lock 27 is mounted rotatably on the supporting ring 24 by means of a rolling bearing 40. The clamping lock 27 has a wrench 28, in this case with a hexagon socket. The dimensions of the wrench 28 correspond to the hexagon of the nut 22.

Figure 5:
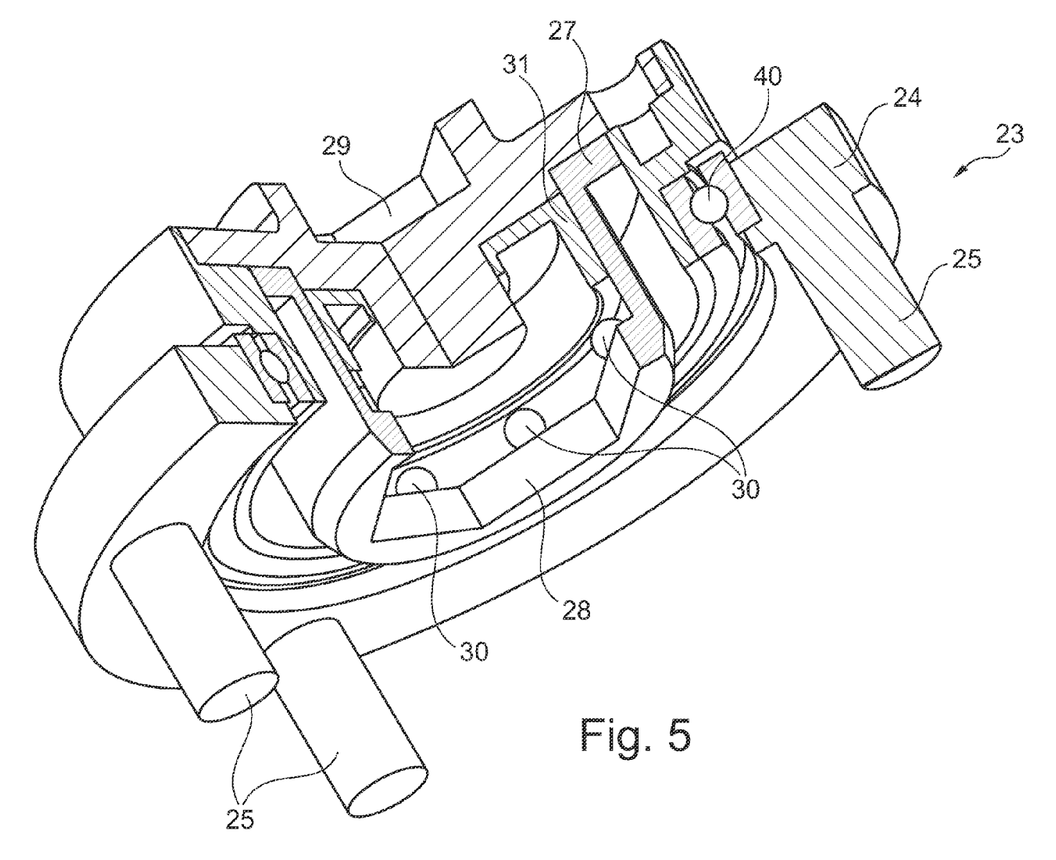
FIG. 5 is a perspective view of the assembly device of the present invention shown in the released position.
Figure 6:
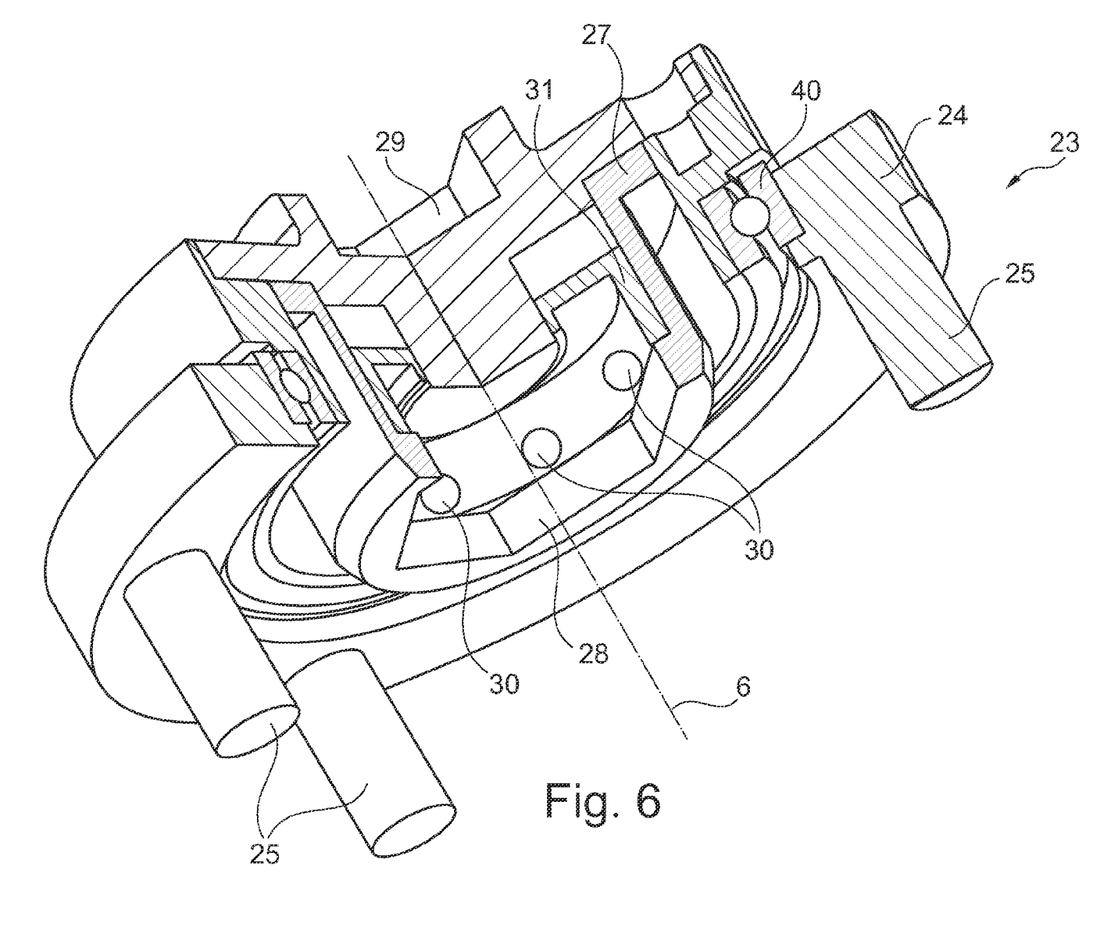
FIG. 6 is a perspective view of the assembly device of FIG. 6 shown in the engaged position.

Furthermore, the clamping lock 27 has a hexagon socket 29 via which a driving torque can be transmitted to the wrench 28. Arranged in the clamping lock 27 are clamping bodies in the form of shaped elements 30, in this case balls, and also an axially movable clamping ring 31. FIG. 5 shows the clamping lock 27 in released position, that is the shaped elements 30 are free of the clamping ring 31 radially. In FIG. 6, the shaped elements 30 have been moved radially toward the longitudinal central axis 6 by means of the clamping ring 31.

Figure 7:
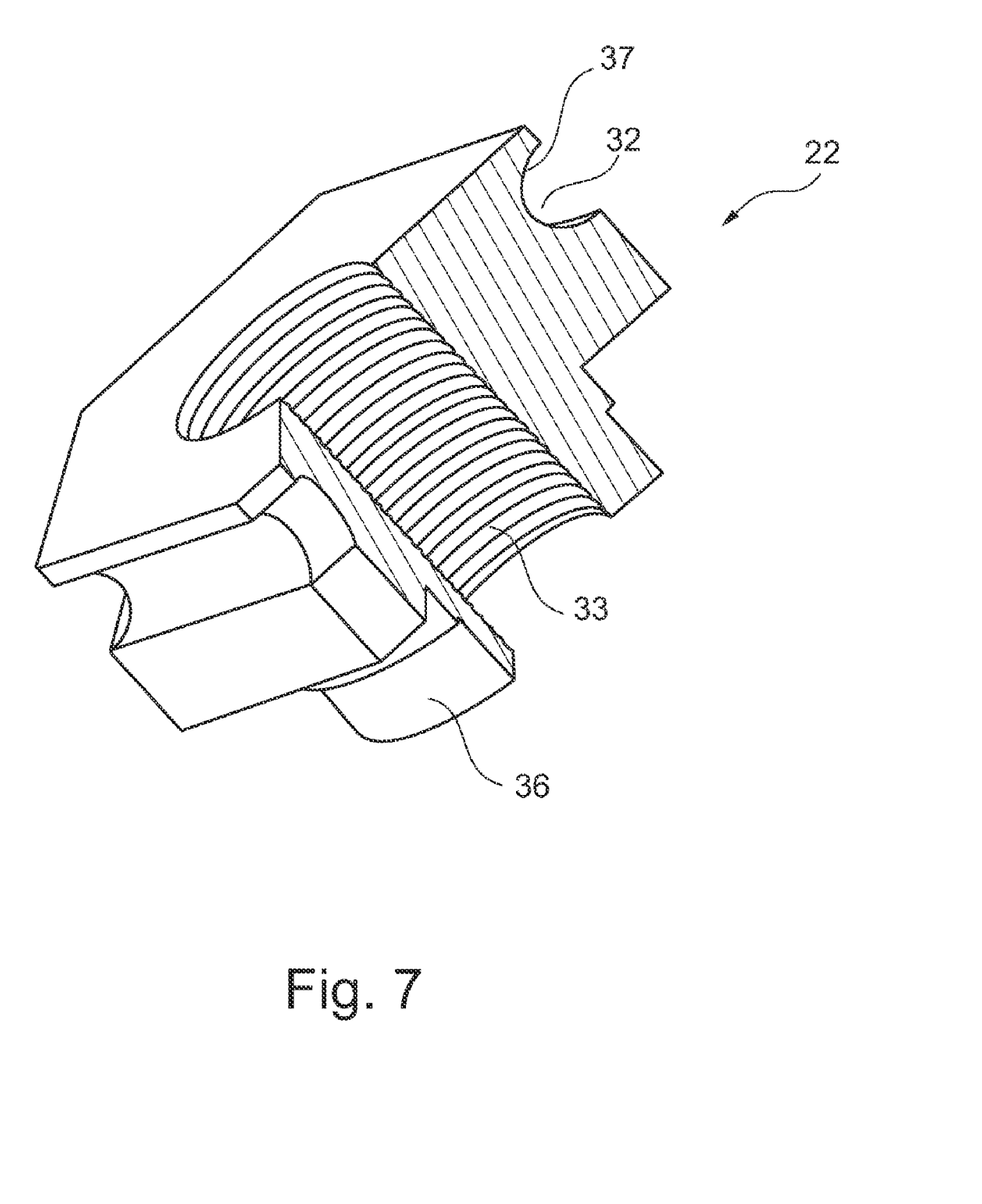
FIG. 7 is a perspective view of the nut of the present invention.
Figure 8:
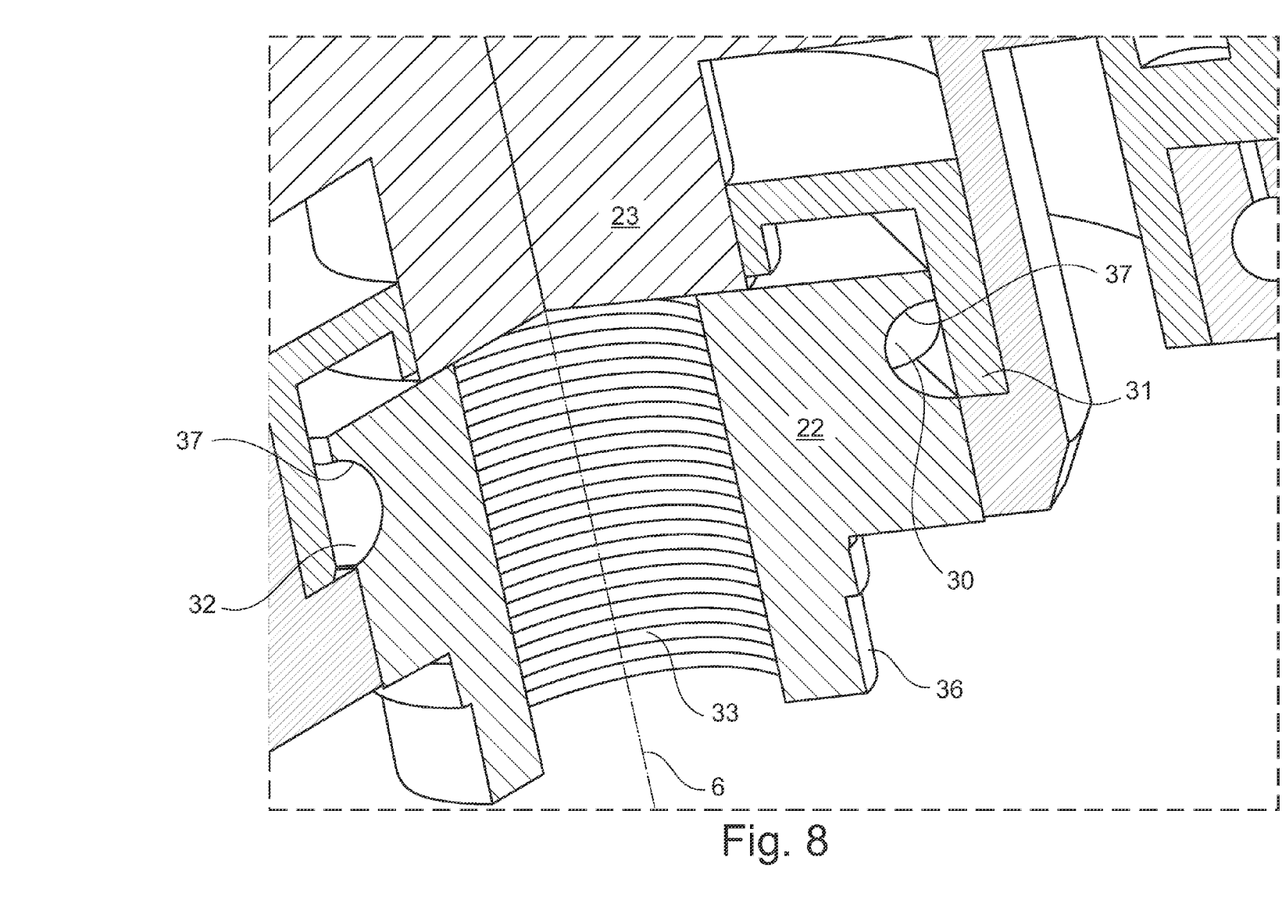
FIG. 8 provides a cross-sectional view of the nut of FIG. 7 installed in the assembly device of FIG. 5.

The shaped elements are intended for positive engagement in an annular groove 32 on the nut 22. The nut 22 is illustrated as an individual part in FIG. 7 and has an internal thread 33 which corresponds to the external thread 34 of the bolt 35 on the drive element 21 according to FIG. 9. The nut 22 is extended axially by means of a shank 36 and is also provided with the internal thread 33 on the inside of the shank 36. The nut is also undercut axially from the direction of the flange 2 by means of the annular groove 32 in such a way that the shaped elements 30, as illustrated in FIG. 8, grip behind the nut 22 axially on a wall 37 facing the flange 2 in the annular groove 32. Clamping jaws, clamping noses engaging radially in the annular groove or expanding rings are also suitable as shaped elements as an alternative to the balls. The external hexagon of the nut 22 sits in the wrench 28 and is held axially in the device by means of the shaped elements 30.

As an alternative to the external hexagon, the nut 22 is provided with all shapes which are suitable for transmitting a tightening torque to the nut 22 about the longitudinal central axis 6. Alternatively, the nut 22 is axially undercut in such a way that lateral surfaces of the nut fall in the direction of the shank 36 and at an angle in relation to the longitudinal central axis 6, so that the nut can in the direction of the flange be gripped behind axially by the clamping elements of a clamping lock.

Figure 9:
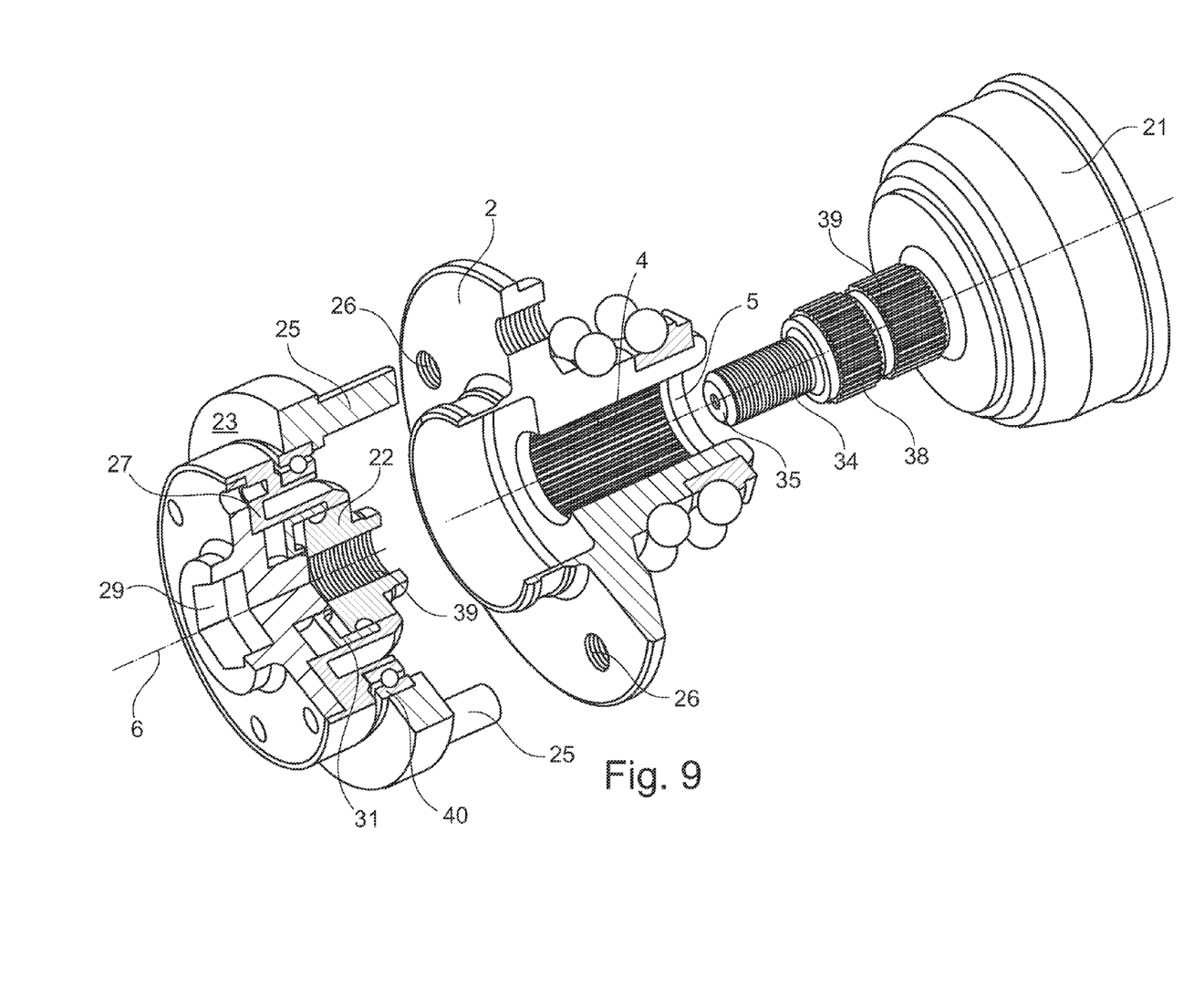
FIG. 9 is a perspective view of the drive element and flange assembly of the present invention.

As illustrated in FIG. 9, the drive element 21 has two external toothings 38 and 39. A positive rotary joint with play can be produced without a press fit between the internal toothing 4 on the flange and the external toothing 38 next to the bolt 35. However, as already described above, the toothing 39 and the internal toothing 4 can only be interconnected positively/non-positively via a press fit. This connection is produced by the external toothing 39, the pairing of which with the internal toothing 4 can be brought about only by the positive/non-positive connection already described above.

The drive element 21 designed in one piece with the bolt 35 and the external toothings 38 and 39 is introduced into the hole 5 axially along the longitudinal central axis 6. In the process, the internal toothing 4 and the external toothing 38 mesh positively. The operation times for drawing the bolt-like extension of the drive element 21 in are advantageously shortened as the thread 38 can be drawn in first without appreciable resistance. The distance over which the extension has to be drawn in counter to the resistance of the positive/non-positive connection is consequently advantageously shortened by the axial length of the external toothing 38. The axial length of the bolt 35 is thus shorter. Moreover, the free end of the bolt 35 does not project so far from the hole 5 and beyond the nut 22 after the rotary joint has been produced. By virtue of the overall shorter bolt-like extension of the drive element 21, material for producing the drive element 21 is saved and the overall weight of the unit is reduced.

Figure 10:
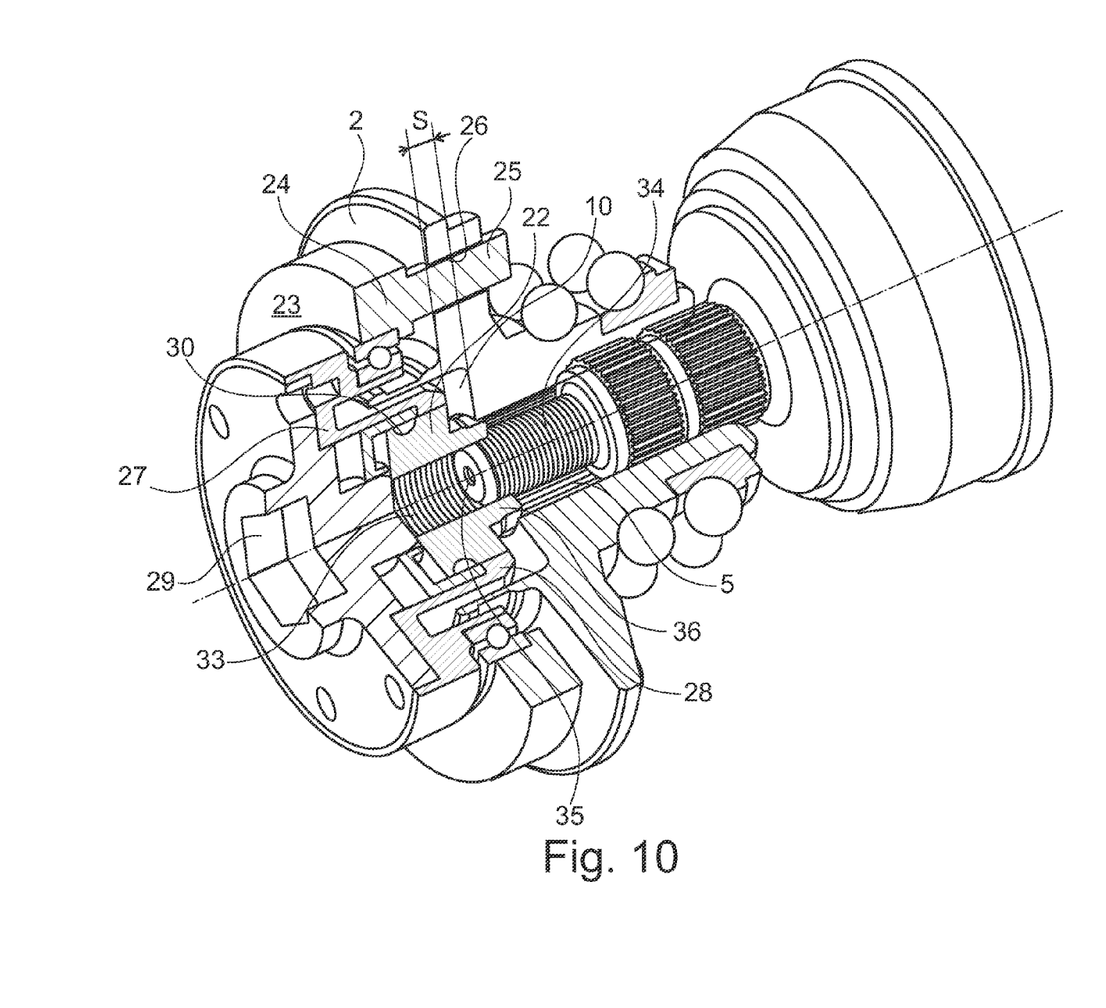
FIG. 10 provides a partially assembled view of the drive element and flange assembly of FIG. 9.

According to the illustration in FIG. 10, the device 23 is positioned in relation to the flange 2. For this, the guide pins 25 of the supporting ring 24 have been inserted into the through-holes 26. The supporting ring 24 is consequently coupled positively to the flange 2 in a rotationally fixed manner. A hexagon (not illustrated further) of a screwing tool engages in the hexagon socket 29. Rotary movements of the screwing tool are transmitted to the wrench 28. The nut 22 is screwed onto the external thread 34 by means of these rotary movements or torques. In the process, the shank 36 of the nut enters into the hole 5 axially, so that the internal thread 33 of the nut 22 engages on the external thread 34 at an early stage. The axial length of the bolt 35 can be kept shorter by means of this axial extension of the internal thread 33 of the nut. Moreover, the number of bearing turns in the thread pairing necessary for the subsequent high loads originating from tightening torques is established at an early stage.

Figure 11:
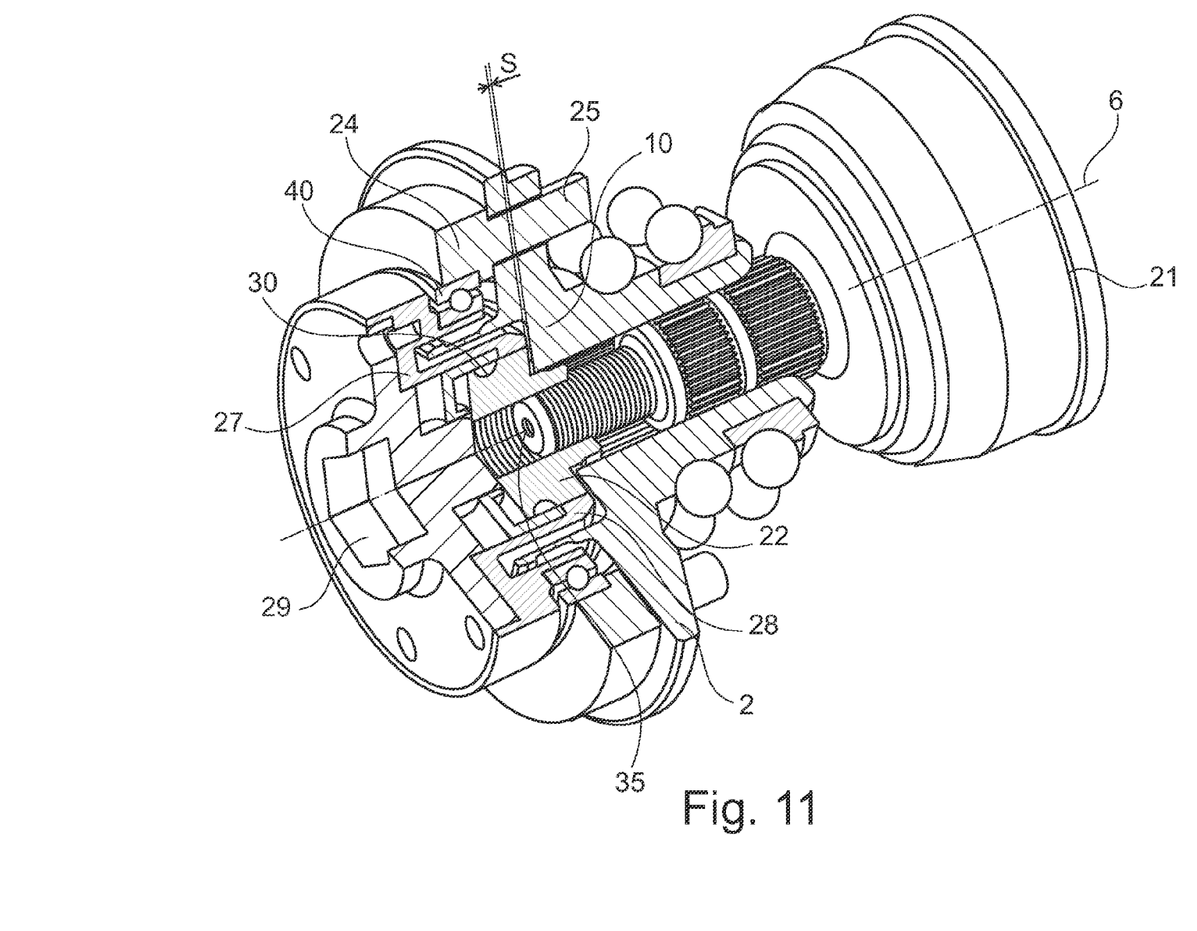
FIG. 11 provides a partially assembled view of the drive element and flange assembly of FIG. 9 illustrating the axially spacing between the flange and the nut during assembly.

The tightening torques about the longitudinal central axis 6 are transmitted from the hexagon socket 29 to the wrench 28 and consequently to the nut 22. At the same time, the nut is kept spaced axially in relation to the supporting surface 10 by the gap dimension S by means of the shaped elements 30 actuated by the clamping lock 27 (FIG. 11). The clamping lock 27 and the wrench 28 are in this connection supported axially on the rolling bearing 40 and mounted rotatably in relation to the supporting ring 24 by means of the rolling bearing 40. The supporting ring 24 is rotationally fixed in relation to the flange 2 by means of the guide pins 25. Rotation of the nut 22 results in the nut 22 being screwed together with the bolt 35 until the drive element 21 is located in its end position in relation to the flange 2.

Figure 12A:
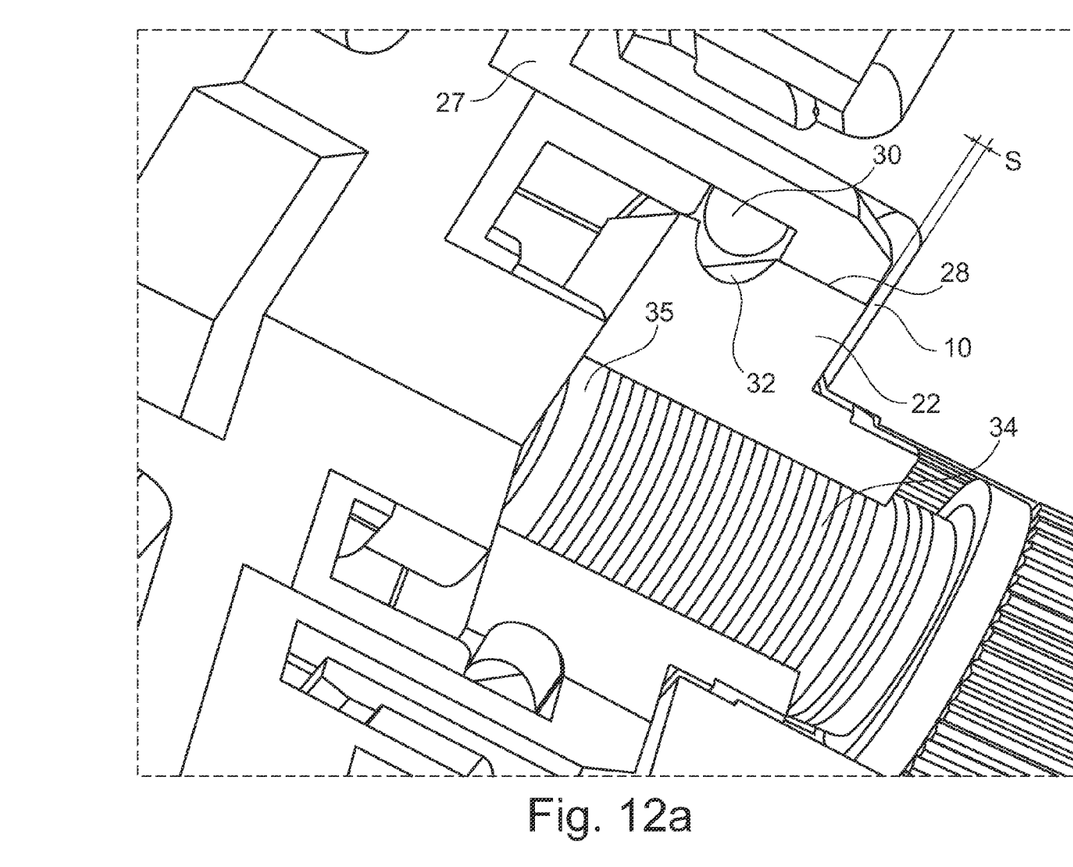
FIG. 12a provides a cross-section view of the assembly of FIG. 11 illustrating the released position.

When the drive element 21 has reached its end position in relation to the flange 2, the tightening torque on the nut 22 increases. This tightening torque can be predetermined and monitored by means of a desired value. If the tightening torque rises to this desired value, a control signal causes the clamping lock 27 to release the nut 22 axially (FIG. 12*a*). The positive connection between the shaped elements 30 and the annular groove 32 is then discontinued.

Figure 12B:
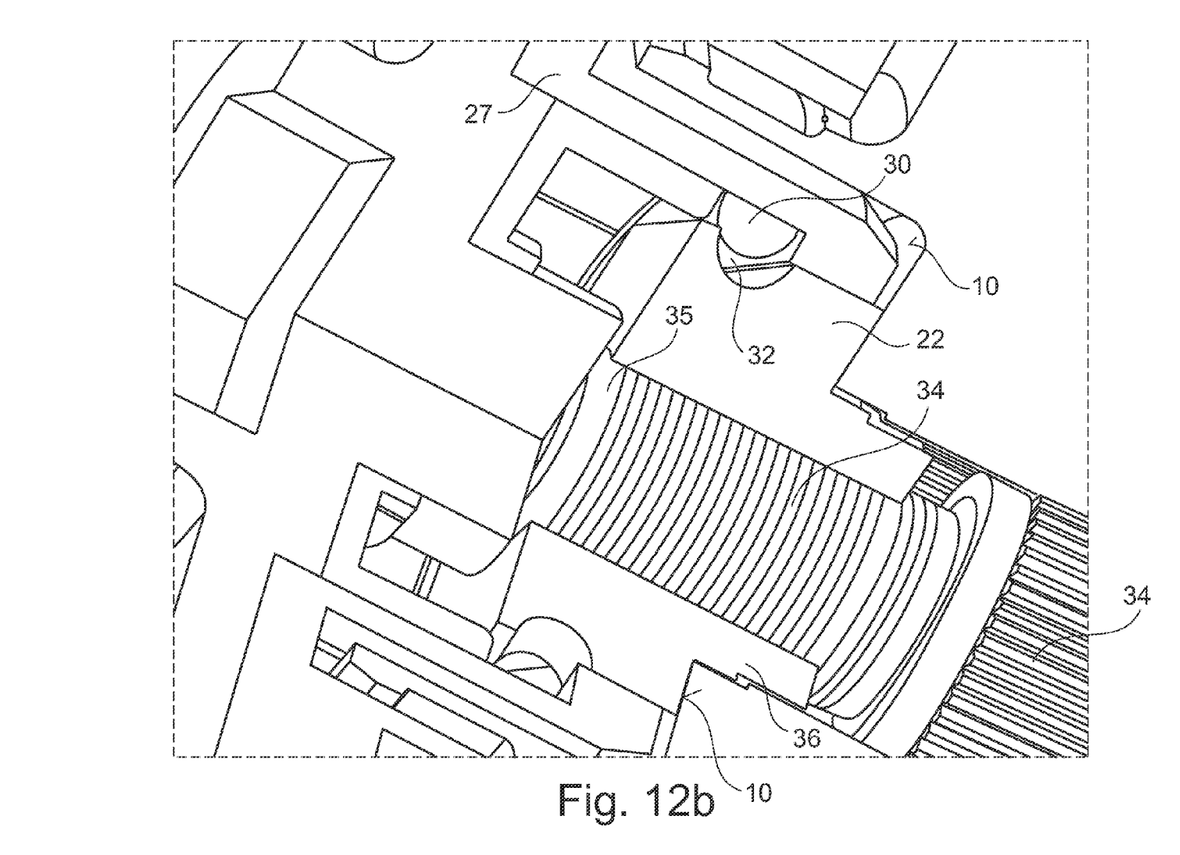
FIG. 12b provides a cross-section view of the assembly of FIG. 11 illustrating the nut in the seated position.

Continued rotation of the wrench 28 overcomes the gap dimension S until the nut 22 bears axially against the supporting surface 10 and the tightening torque on the nut 22 necessary for securing the wheel bearing arrangement is reached (FIG. 12*b*). After the desired value has been reached, the device is removed axially from the flange 2 and the finished assembled unit, as illustrated in FIG. 13.

REFERENCE NUMBERS

1 Drive Element
2 Flange
3 External Toothing
4 Internal Toothing
5 Hole
6 Longitudinal Central Axis
7 Bolt
8 External Thread
9 Nut
10 Supporting Surface
11 Contact Area
12 Bearing
13 Axial Rolling Bearing
14 Axial Disks
15 Balls
16 Balls
17 Raceway
18 Raceway
19 Inner Ring
20 Flanged Rim
21 Drive Element
22 Nut
23 Device
24 Supporting Ring
25 Guide Pin
26 Through-Hole
27 Clamping Lock
28 Wrench
29 Hexagon Socket
30 Shaped Element
31 Clamping Ring
32 Annular Groove
33 Internal Thread
34 External Thread
35 Bolt
36 Shank
37 Wall
38 External Toothing
39 External Toothing
40 Rolling Bearing

What is claimed:

1. A method for producing a rotary joint between a drive element and a flange wherein the drive element and the flange are screwed to one another at least by a nut and by a bolt of the drive element at least until the bolt is by rotation of the nut drawn axially into a hole of the flange as far as an end position of the drive element in relation to the flange, the method comprising the steps of:
    introducing the bolt into an axial hole of the flange from one axial side of the flange until a loose screwed joint can be produced between the bolt and the nut, the nut lying opposite the flange axially on a side of the flange facing away axially from the axial side;
    mounting the nut onto the bolt; and
    screwing the nut together with the bolt and in so doing drawing the bolt axially into the hole by rotating the nut, keeping the nut spaced axially in relation to the flange during drawing of the bolt into the hole with the nut spaced axially in relation to the flange until the drive element is located in the end position in relation to the flange and the nut is then screwed together with the bolt until the nut is prestressed axially against the flange.

2. A method for producing a rotary joint between a drive element and a flange, wherein the drive element and the flange are screwed to one another at least by a nut and by a bolt of the drive element at least until the bolt is by rotation of the nut drawn axially into a hole of the flange as far as an end position of the drive element in relation to the flange, the method comprising the steps of:
    introducing the bolt into an axial hole of the flange from one axial side of the flange until a loose screwed joint can be produced between the bolt and the nut, the nut lying opposite the flange axially on a side of the flange facing away axially from the axial side;
    mounting the nut onto the bolt; and
    screwing the nut together with the bolt and in so doing drawing the bolt axially into the hole by rotating the nut, keeping the nut spaced axially in relation to the flange during drawing of the bolt into the hole with the nut spaced axially in relation to the flange until the drive element is located in the end position in relation to the flange and the nut is then first released in an axial direction and finally the nut is screwed to the bolt until the nut is prestressed axially against the flange.

3. A method for producing a rotary joint between a drive element and a flange, wherein the drive element and the flange are screwed to one another at least by a nut and by a bolt of the drive element at least until the bolt is by rotation of the nut drawn axially into a hole of the flange as far as an end position of the drive element in relation to the flange, the method comprising the steps of:
    introducing the bolt into an axial hole of the flange from one axial side of the flange until a loose screwed joint can be produced between the bolt and the nut, the nut lying opposite the flange axially on a side of the flange facing away axially from the axial side;
    mounting the nut onto the bolt; and
    screwing the nut together with the bolt and in so doing drawing the bolt axially into the hole by rotating the nut, keeping the nut spaced axially in relation to the flange during drawing of the bolt into the hole with the nut is kept spaced axially in relation to the flange until a tightening torque on the nut defined by a first desired value is reached.

4. A method for producing a rotary joint between a drive element and a flange, wherein the drive element and the flange are screwed to one another at least by a nut and by a bolt of the drive element at least until the bolt is by rotation of the nut drawn axially into a hole of the flange as far as an end position of the drive element in relation to the flange, the method comprising the steps of:
    introducing the bolt into an axial hole of the flange from one axial side of the flange until a loose screwed joint can be produced between the bolt and the nut, the nut lying opposite the flange axially on a side of the flange facing away axially from the axial side;
    mounting the nut onto the bolt; and
    screwing the nut together with the bolt and in so doing drawing the bolt axially into the hole by rotating the nut, keeping the nut spaced axially in relation to the flange during drawing of the bolt into the hole the nut spaced axially in relation to the flange by a device, the nut first bearing against the flange when the drive element has occupied the end position in relation to the flange by virtue of rotation of the nut.

5. The method as claimed in claim 4, wherein the nut is rotated by the device at least until the drive element is located in the end position.

6. The method as claimed in claim 5, wherein the device is supported at least axially on the flange and is then coupled releasably to the nut, the nut being supported on the device rotatably relative to the flange.

7. The method as claimed in claim 4, wherein the nut is kept spaced axially in relation to the flange by the device until a tightening torque on the nut, defined by a first desired value, is reached and in that the nut is rotated by the device until the first desired value is reached.

8. The method as claimed in claim 7, wherein the nut is screwed together with the bolt by the device until the nut is prestressed axially against the flange and a second desired value is reached.

* * * * *